United States Patent [19]

Cohen

[11] 3,720,179
[45] March 13, 1973

[54] POWER SYSTEM FOR UNDERWATER VEHICLE

[75] Inventor: Ronald Cohen, Newington, Conn.

[73] Assignee: The United States of America as represented by the Secretary of the Air Force

[22] Filed: Dec. 9, 1971

[21] Appl. No.: 206,461

[52] U.S. Cl. ................................................114/16 G
[51] Int. Cl. ...................................................B63g 8/00
[58] Field of Search ........114/16 R, 16 G, 16.4, 16.7, 114/51; 244/1 SD; 61/69 R, 69 A

[56] References Cited

UNITED STATES PATENTS

| | | | |
|---|---|---|---|
| 3,625,171 | 12/1971 | Bailey | 114/16 R |
| 3,646,771 | 3/1972 | Greene | 114/16 R |
| 2,377,695 | 6/1945 | Justus | 114/16.4 |

*Primary Examiner*—Milton Buchler
*Assistant Examiner*—Galen L. Barefoot
*Attorney*—R. S. Sciascia et al.

[57] ABSTRACT

A power system for an underwater vehicle adaptable for being replaced underwater. An access compartment is provided in a crew transfer compartment and the access compartment has an opening which is engaged by a protrusion on a power supply to provide a watertight access compartment. Electrical connectors are provided on said power supply and in said access compartment and a cable connects these connectors thereby providing electrical power to said underwater vehicle. Locking means which are actuatable from the crew transfer compartment are provided for locking said power supply to said underwater vehicle.

4 Claims, 4 Drawing Figures

PATENTED MAR 13 1973 3,720,179

POWER SYSTEM FOR UNDERWATER VEHICLE

BACKGROUND OF THE INVENTION

The present invention relates to a power system for an underwater vehicle, such as a small, deep submergence boat, and more particularly to a power system which can be replaced while the vehicle remains underwater.

Many small, deep submergence boats use batteries as a source of power and considerable time is required for recharging. When the submergence boat is associated with an underwater habitat, the underwater platform of the habitat must have an energy source with sufficient capacity to charge the batteries.

Fuel cells may also be used as a source of power and the time for recharging is not nearly as long as that for batteries. A serious safety problem is encountered, however, when reactants are transferred from a storage facility into a submersible while under water. The safety problem becomes more pronounced with present day reactants such as high pressure hydrogen and oxygen; cryogenic hydrogen and oxygen; and hypergolic hydrazine hydrate and hypergolic hydrogen peroxide, as these reactants are particularly hazardous if they become contaminated with sea water.

SUMMARY OF THE INVENTION

The present invention relates to a power system for an underwater vehicle which can be removed and replaced with another power system while the vehicle is submerged. An access compartment having an opening is provided in a crew transfer compartment, and a power supply is slidably mounted to the underwater vehicle and has a protrusion that engages with the opening to provide a waterproof compartment. A connector assembly is provided in the access compartment so that the power supply can provide power to the vehicle. Locking means which are actuatable from the crew transfer compartment are provided for locking the power supply to the vehicle.

DESCRIPTION OF THE PREFERRED EMBODIMENT

Figure 1:
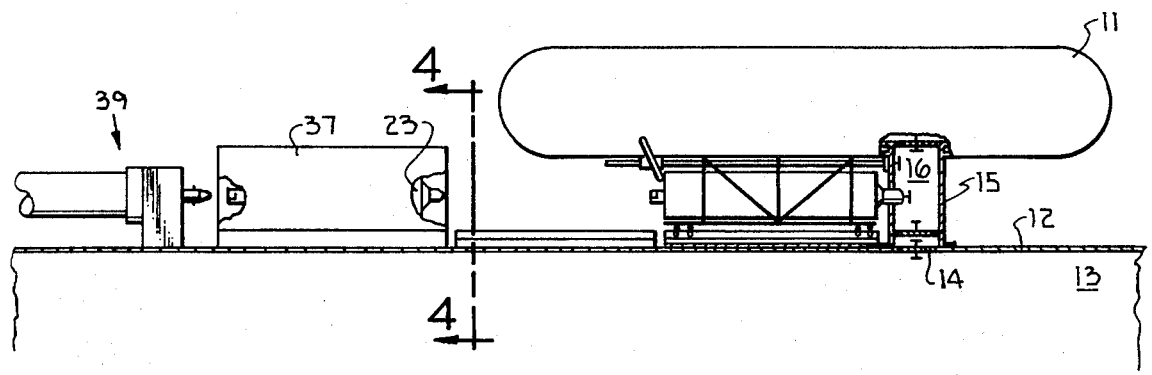
FIG. 1 is a side view showing an underwater vehicle on the platform of an underwater habitat.

Referring first to FIG. 1 of the drawings, an underwater vehicle 11 is docked on top of a deck 12 of an underwater habitat 13. By way of example, habitat 13 might have a hatch 14 in deck 12 so that divers or crew members of a submersible may enter or leave the habitat. A crew transfer skirt 15, having a compartment 16 therein, is provided on vehicle 11, and in the drawings, the crew transfer skirt 15 is shown positioned over hatch 14 in habitat 13. By way of example, crew transfer skirt 15 is provided with hatches 17 and 18 to permit crew members to enter vehicle 11 from habitat 13. An access compartment 19 is provided in transfer skirt 15 and has an opening outside the transfer skirt and a door 21 on the other end. The wall 22 forming compartment 19 flares outwardly at the opening to provide a funnel-shaped opening.

Figure 2:
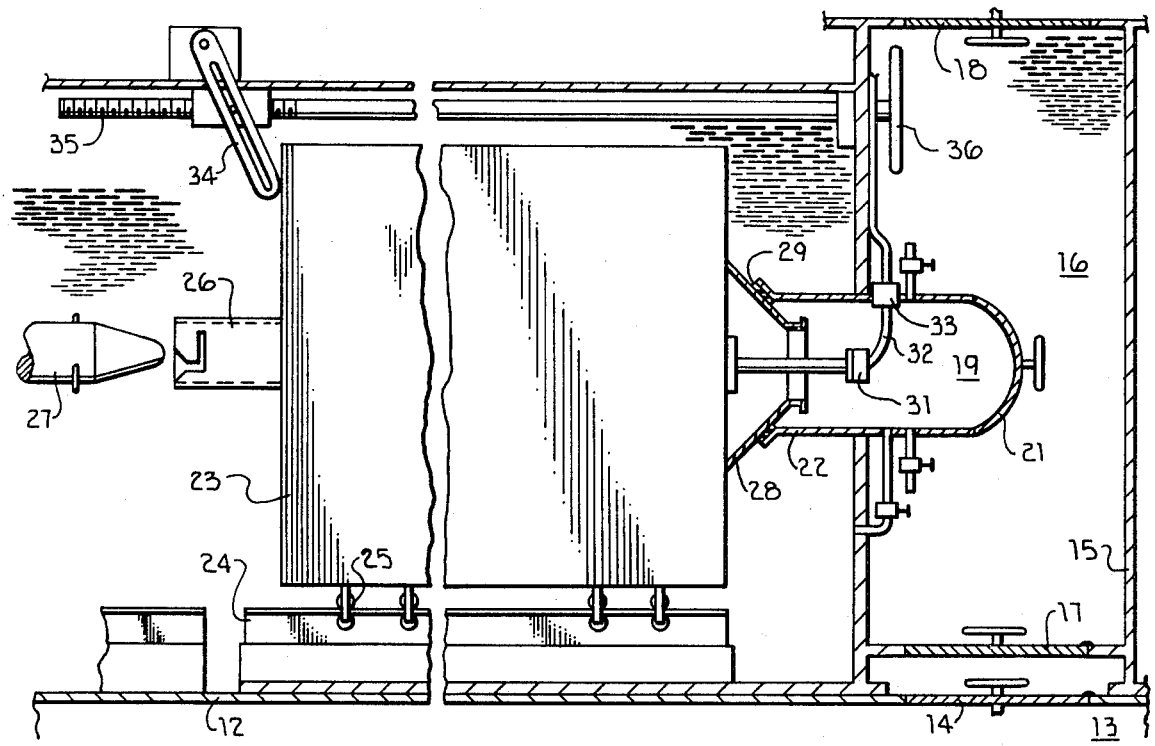
FIG. 2 is a partial sectional view showing a power supply in a locked position in an underwater vehicle.
Figure 3:
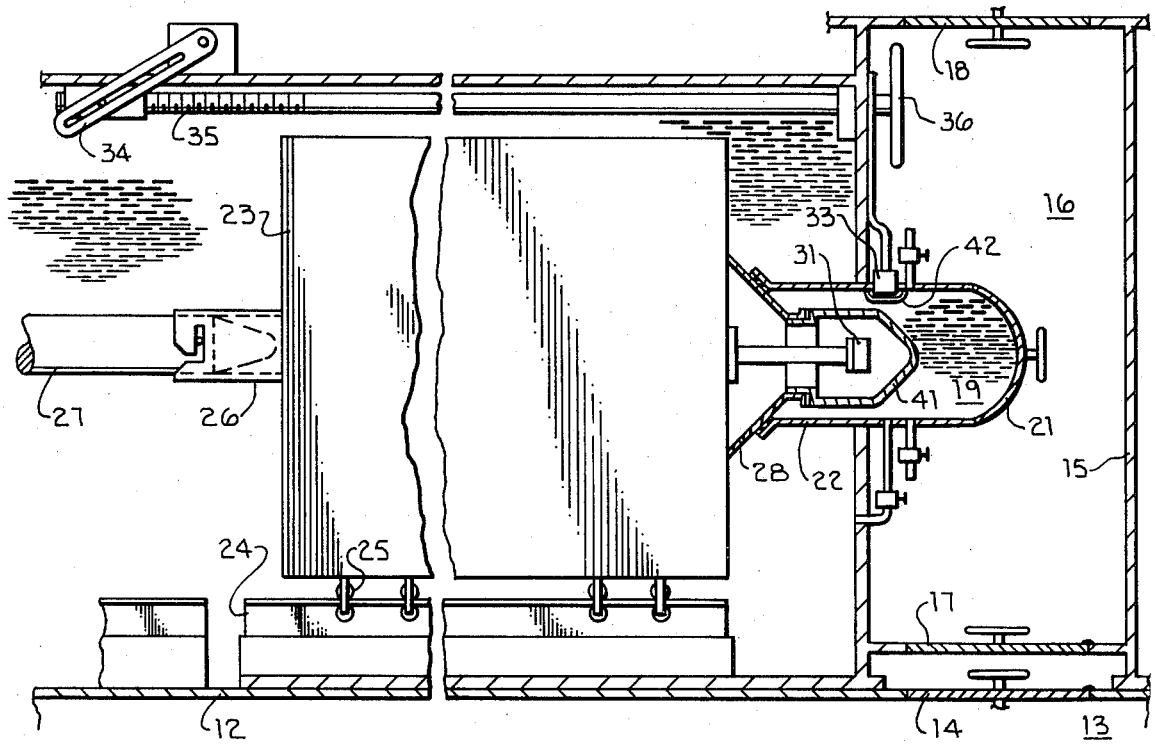
FIG. 3 is a partial sectional view showing a power supply in an unlocked position in an underwater vehicle.

As best shown in FIGS. 2 and 3 of the drawings, a power supply 23 is slidably mounted in vehicle 11 so that it can be readily removed. By way of example, rails 24 and rollers 25 may be provided for loading and unloading power supply 23. A coupling 26 is provided on the aft end of power supply 23 and coupling 26 is engageable with a ram 27 which is used to move power supply 23. A conical-shaped protrusion 28 is provided on the forward end of power supply 23 and engages in the funnel-shaped opening of compartment 19. A gasket 29 is provided between protrusion 28 and the tapered portion of wall 22 to provide a water-proof seal. As shown in FIG. 2 of the drawing, an output connector 31 is provided on power supply 23 and extends into compartment 19, and a cable 32 connects connector 31 with an input connector 33 so that power supply 23 provides power to vehicle 11. A locking lever 34 is pivotally attached to a bulkhead and is movable by threaded shaft 35 that has a handwheel 36 inside compartment 16. Lever 34 locks power supply 23 in vehicle 11 and also applies an axial force so that protrusion 28 is in a sealing relation with the tapered portion of wall 22.

Figure 4:
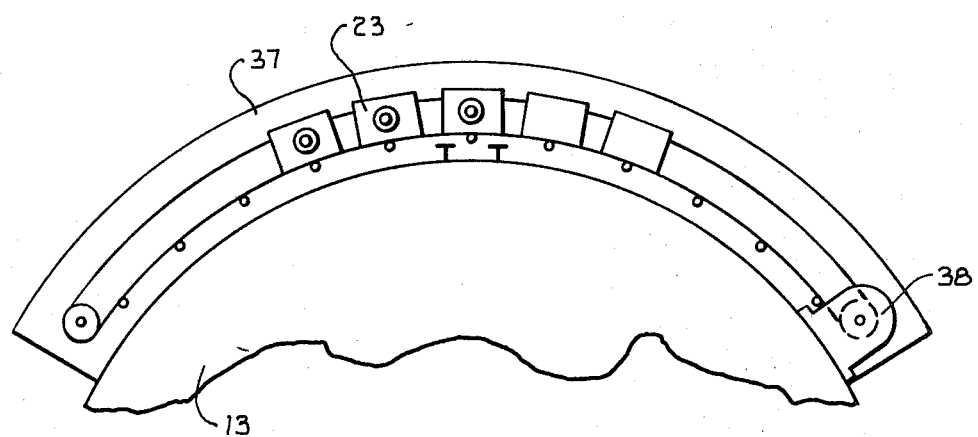
FIG. 4 is a partial end view of a storage saddle having additional power supplies.

Referring now to FIGS. 1 and 4 of the drawings, a storage rack 37 is provided on top of habitat 13 to hold a plurality of power supplies 23. A conveyor mechanism 38 is used to position power supplies in alignment with vehicle 11 and a ram mechanism 39 is used to remove and replace power supplies.

OPERATION

Compartment 16 in crew transfer skirt 15 will normally be flooded during operation of vehicle 11 and, upon docking on deck 12 of habitat 13, compartment 16 is pumped dry. When it is desired to replace power supply 23, door 21 to compartment 19 is opened and cable 32 is removed. Protective caps 41 and 42 are then placed over connectors 31 and 33 to protect them from sea water. Door 21 is then closed and compartment 19 is flooded. Next, ram 27 is engaged with coupling 26 and then locking lever 34 is pivoted to an unlocked position by turning handwheel 36. FIG. 3 of the drawings shows a power supply 23 in a condition for being removed from vehicle 11. Ram mechanism 39 is actuated and power supply 23 is rolled out and placed in a vacant compartment in storage rack 37. Ram 27 is then unlocked from coupling 26 and storage rack 37 is rotated so that a fresh power supply 23 is in position to be loaded. Ram 27 is then engaged with coupling 26 on the fresh power supply 23 which is then pushed into position. Locking lever 34 is engaged with fresh power supply 23 and ram 27 is then withdrawn.

Water is drained from compartment 19 and then door 21 is opened and protective caps 41 and 42 are removed. Cable 32 is connected to connectors 31 and 33 and power can then be supplied to vehicle 11.

I claim:

1. A power supply system for an underwater vehicle having a crew transfer compartment comprising, walls forming an access compartment in said crew transfer compartment, said walls having a door on one end and an outside opening on an opposite end of said door, an electrical power input connector in said access compartment, a power supply having an output connector, said power supply being slidably mounted in said vehicle and having a protrusion engageable in said outside opening, cable means connecting said output and input connectors, and locking means for locking said power supply in said underwater vehicle.

2. A power supply system for an underwater vehicle as set forth in claim 1 wherein said protrusion is conical shaped and wherein said walls are flared at said outside opening and wherein sealing means are provided between said conical shaped protrusion and the flared portion of said walls.

3. A power supply system for an underwater vehicle as set forth in claim 1 wherein said locking means are remotely actuated from within said crew transfer compartment.

4. A power supply system for an underwater vehicle as set forth in claim 1 wherein coupling means are provided on said power supply for facilitating slidable movement in said vehicle.

* * * * *